3,636,086
METHOD FOR INHIBITING THE POLYMERIZATION OF UNSATURATED CARBOXYLIC ACID ESTERS
Akio Yamagishi, Takaharu Ishida, Yukinaga Aono, and Shigekatsu Kondo, Niihama-shi, Japan, assignors to Sumitomo Chemical Company Ltd., Osaka, Japan
No Drawing. Filed Sept. 8, 1969, Ser. No. 856,200
Int. Cl. C07c 69/54
U.S. Cl. 260—486 R        8 Claims

ABSTRACT OF THE DISCLOSURE

Acrylic and methacrylic acid esters can be prevented from polymerization due to the presence of water in the steps of preparation thereof by addition of a radical polymerization inhibitor together with at least one compound selected from the group consisting of condensed phosphoric acid salts such as alkali pyrophosphates, tripolyphosphates, tetrametaphosphates and hexametaphosphates, and silicic acid salts.

---

This invention relates to a process for inhibiting the polymerization of unsaturated carboxylic acid esters, particularly acrylic and methacrylic acid esters. More particularly, the invention pertains to a process for preventing said esters from polymerization taking place when they are brought into contact with, and are made present together with, an aqueous phase during the preparation or purification thereof.

The above-mentioned esters have unsaturated bonds and hence tend to polymerize during the step of preparation or purification thereof due to the influence of air, light, heat or peroxides. This tendency is particularly marked in the cases of aqueous solution systems containing said esters, e.g. systems in which said esters are present together with aqueous phases or are in the form of aqueous solutions. In such cases as above, said esters seem to be susceptible to iron ions, which migrate into the aqueous phases or aqueous solutions. For example, the esters immediately polymerize in the case where a common steel is used as a material for equipments, and are promoted in polymerizability even in the case where the equipments are made of such a material as, for example, 28 or 33 chrome stainless steel, which is dissolved in not more than such an extremely slight amount that no metal ions can be detected, in practice.

Aqueous solution systems containing said esters should be produced in any processes which have heretofore been proposed. Further, to use a common steel or stainless steel as an equipment material is an ordinary practice in the industry.

In order to prevent the polymerization of said esters, many polymerization inhibitors therefor have been investigated heretofore, and, for example, hydroquinone, hydroquinone monomethyl ether, pyrogallol, resorcinol and Methylene Blue have been well known as such polymerization inhibitors. These polymerization inhibitors are effective particularly in water-free systems employed for the purpose of storage or transportation of said esters. In aqueous solution systems containing said esters, however, the above-mentioned polymerization inhibitors cannot prevent the polymerization. This is considered ascribable to the influence of iron ions migrating into the aqueous solution systems, as has previously been mentioned. This could be confirmed also by such experiment of the present inventors as set forth below.

That is, an esterification reaction liquid formed in the step of synthesis of methyl methacrylate was distilled by use of a glass-made condenser, whereby no substantial polymerization of said ester was observed in the distillate. However, it was recognized that when ferric sulfate was added to and dissolved in the aqueous phase of said distillate, the ester was polymerized immediately.

The present inventors made various studies in order to effectively inhibit the polymerization of said esters while suppressing the detrimental effects of iron ions. As the result, the inventors have found that when condensed phosphoric acid salt, or silicic acid salt (hereinafter referred to "the additive") is used in addition to the aforesaid polymerization inhibitor, the abovementioned object can be attained and, even in aqueous solution systems containing said esters, smooth operations can be effected without formation of polymers.

In accordance with the present invention, there is provided a process for preventing the polymerization of an unsaturated carboxylic acid ester such as an acrylic or methacrylic acid ester, characterized in that an aqueous solution system containing said ester is incorporated with, in addition to a polymerization inhibitor, at least one compound selected from the group consisting of condensed phosphoric acid salts, and silicic acid salts.

"The aqueous solution systems containing said esters," which are referred to in the present invention, signify aqueous systems in which phases of said esters are present together with an aqueous phase, or systems in which said esters are in the form of aqueous solutions. Ordinarily, these aqueous solution systems contain other components such as methanol or methacrylic acid. For the commercial scale production of said esters, various processes have been proposed. In every process, however, a more or less amount of such aqueous solution system is used. Examples of this fact are set forth below.

(1) Methyl methacrylate is ordinarily obtained in such a manner that acetone cyanhydrin is reacted with sulfuric acid to form methacrylamide sulfate and is then esterified by addition of methanol and water. The ester is separated from the reaction mixture either by simple distillation or by steam distillation using superheated steam, in most cases. In both cases, however, the distillate contains an ester phase and an aqueous phase, since the ester constantly boils together with water, and the two phases are separately present in the distillate (the state in, for example, a decanter).

(2) The crude methyl methacrylate obtained according to (1) contains methanol and water, which constantly boil together with the methyl methacrylate. Accordingly, the separation thereof by distillation alone is not economical, and it is effective to adopt such a procedure that the methanol is extracted, prior to the distillation step, with water or an aqueous inorganic salt solution (e.g. according to counter current continuous extraction or by use of a mixer-settler), or is separated by extractive distillation. According to this procedure, the methyl methacrylate is present in the apparatus together with the aqueous phase and has been dissolved also in the separated aqueous methanol solution.

(3) Further, the case where distillation is effected in order to concentrate the extracted aqueous methanol solution is identical with the case where an aqueous solution containing methyl methacrylate is treated.

(4) On the other hand, it is well known that the bottom residue of the esterification reaction liquid is further subjected to steam distillation to recover chiefly the remaining methanol, which is then returned back to the esterification reaction system. The distillate formed by said distillation is also an aqueous solution containing methyl methacrylate.

(5) While the above has been described with reference to the case of methyl methacrylate, methyl acrylate is obtained, for example, in such a manner that acrylonitrile is reacted with sulfuric acid to form acrylamide and is then esterified by addition of methanol and water, and the ester is distilled by single distillation. In this case also, the distillate separates into an ester phase and an aqueous phase in a condenser or a decanter, and the two phases are present together.

In almost all of the above-mentioned cases where a common steel or stainless steel is used as an equipment material, polymerization takes place immediately, or within several hours at the longest, if the inhibitor is added alone, and the polymer, which is in the form of a slurry or jelly, cloggs every part of the equipment to make normal operations impossible. The polymerization is marked particularly when a common steel is used or the temperature is high. However, when a polymerization inhibitor is used in combination with the additive employed in the present invention, the polymerization can be completely prevented in any of the above-mentioned cases. This is considered ascribable to the fact that the additive in accordance with the present invention has a property to effect as a corrosion resistant to form complex compound, and hence suppresses the detrimental effects of iron ions to make it possible to effectively display the actions of the polymerization inhibitor.

The additive of the present invention, when used alone, has no polymerization-inhibiting ability and hence should be used in combination with a polymerization inhibitor. The polymerzation inhibitor usable in the present process may be an optional compound, but is preferably such a radical polymerization inhibitor as, for example, hydroquinone, hydroquinone monomethyl ether, pyrogallol, resorcinol or Methylene Blue. The optimum amount of the polymerization inhibitor to be added is 0.001–0.5% by weight based on the amount of the aqueous solution system.

As the condensed phosphoric acid salts which are employed as the additives in the present invention, there may be shown salts of polyphosphoric, metaphosphoric and ultraphosphoric acids. Concrete examples thereof include sodium pyrophosphate, sodium tripolyphosphate, potassium tripolyphosphate, sodium tetrapolyphosphate, sodium tetrametaphosphate, sodium hexametaphosphate, potassium hexametaphosphate, etc. Further, examples of the silicic acid salt include sodium silicate, potassium silicate, etc.

The additives and the polymerization inhibitors may individually be used effectively either singly or in any combination of 2 or more. The amount of the additive to be added in several p.p.m. (weight ratio) or more, preferably 0.001–0.1% by weight, based on the amount of the aqueous solution system containing the ester.

The present invention is applicable not only to aqueous solutions of methyl methacrylate and methyl acrylate, but also to those of other methacrylic and acrylic acid esters and to the cases where said esters are present together with an aqueous phase.

The present invention is illustrated in further detail below with reference to examples. However, it is not intended to limit the invention. Percents are by weight.

EXAMPLE 1

To a methacrylamide sulfate synthesized from 1 mole of acetone cyanhydrin and 1.5 moles of sulfuric acid were added 2 moles of methanol and 4 moles of water to effect esterification reaction. The esterification reaction product was distilled at 100° C. in a stainless steel-made condenser, while adding hydroquinone in an amount of 0.03% based on the amount of the distillate. The distillate separated into an ester phase and an aqueous phase. The aqueous phase immediately polymerized at 25° C. in the condenser and in a decanter, and migrated also into the ester phase.

On the other hand, the above-mentioned esterification reaction product was distilled by use of the same condenser as in the above, while adding hydroquinone and sodium hexametaphosphate in amounts of 0.01% and 0.02%, respectively, whereby the aqueous phase of the distillate did not polymerize even when allowed to stand at 25° C. for more than 1 month. Further, no polymerization took place even when said aqueous phase was maintained at 70° C. for 6 hours.

EXAMPLE 2

The same esterification reaction as in Example 1 was effected, and the esterification product was taken out by steam distillation using superheated steam at 130° C. In this case, the distillation was effected by use of a stainless steel-made condenser, while adding hydroquinone monomethyl ether in an amount of 0.01% based on the amount of the distillate, whereby the aqueous phase of the distillate immediately polymerized at 25° C. in the condenser and a decanter.

On the other hand, the same esterification product as in the above was distilled by use of the same condenser as in the above, while adding hydroquinone and sodium hexametaphosphate in amounts of 0.01% and 0.05%, respectively, whereby the aqueous phase of the distillate did not polymerize even when allowed to stand at 25° C. for more than 1 month, and no polymerization took place even when it was maintained at 70° C. for 6 hours.

EXAMPLE 3

The same esterification reaction product containing hydroquinone as in Example 1 was distilled by use of a glass-made condenser. To 100 g. of the aqueous phase of the distillate was added 0.0036 g. of ferric sulfate (10 p.p.m. calculated as Fe), whereby polymerization took place immediately. However, when 0.020 g. of sodium hexametaphosphate had previously been added to the aqueous phase, no polymerization took place even when the aqueous phase was allowed to stand for 1 month.

Further, no polymerization took place either in the case where sodium silicate had been added in place of the sodium metaphosphate.

EXAMPLE 4

The same esterification reaction product as in Example 1 was distilled by single distillation. The bottom residue formed in the distillation was subjected to steam distillation by use of a stainless steel-made condenser, while adding resorcinol in an amount of 0.01% based on the amount of the distillate, whereby the distillate immediately polymerized at 25° C.

On the other hand, the above-mentioned bottom residue was distilled at 115° C. by use of the same condenser as in the above, while adding resorcinol and sodium tripolyphosphate in amounts of 0.01% and 0.05%, respectively, based on the amount of the distillate, whereby the distillate did not polymerize even when allowed to stand at 25° C. for more than 1 month, and no polymerization took place either even when the distillate was maintained at 70° C. for 6 hours.

EXAMPLE 5

The same esterification product as in Example 1 was distilled by use of a glass-made condenser, while adding pyrogallol in an amount of 0.03% based on the amount of the distillate. The crude ester phase of the distillate was extracted with water in an amount equal to that of the ester, using a stainless steel-made counter current extractor, whereby the ester in the extracted aqueous methanol solution polymerized after 5 hours.

On the other hand, the above-mentioned crude ester phase was extracted, using the same extractor as in the above, with an equal amount of water containing 0.01% of sodium hexametaphosphate, whereby no polymerization took place even when the operation was continued for more than 6 months. Further, in the case where hydroquinone was used in place of the pyrogallol, the operation could be continued for more than 6 months, as well. Likewise, no polymerization took place either in the case where sodium tetrapolyphosphate was used in place of the sodium metaphosphate.

EXAMPLE 6

An aqueous methanol solution, which had been formed by extracting crude methyl methacrylate with methanol-water by use of a glass-made counter current extractor while adding 0.03% of hydroquinone, was subjected to methanol concentration in a stainless steel-made distillator. In this case, the dissolved methyl methacrylate immediately polymerized in the preheater for the solution and in the distillator to bring about various troubles.

On the other hand, the above-mentioned aqueous methanol solution was subjected to the same distillation as in the above, while adding 0.03% of sodium tripolyphosphate, whereby no polymerization took place even when the operation was continued for more than 6 months. Further, the same result was obtained also in the case where potassium hexametaphosphate was used in place of the sodium tripolyphosphate.

EXAMPLE 7

2 moles of acrylonitrile was hydrolyzed at 100° C. for 1 hour by addition of 3 moles of 85% sulfuric acid and 0.5 g. of copper powder. After elevating the temperature to 140°–150° C., the hydrolyzate was esterified by addition of 6 moles of methanol and 9 moles of water. Subsequently, the esterification product was distilled by use of a stainless steel-made condenser, while adding hydroquinone in an amount of 0.01% based on the distillate, whereby the aqueous phase of the crude ester (distillate) immediately polymerized.

On the other hand, the above-mentioned esterification product was distilled by use of the same condenser as in the above, while adding hydroquinone and sodium silicate in amounts of 0.01% and 0.05%, respectively, based on the amount of the distillate, whereby the aqueous phase of the crude ester did not polymerize even when allowed to stand for more than 1 month.

The same result was obtained also in the case where the sodium silicate was used.

What is claimed is:
1. An aqueous solution containing unsaturated carboxylic acid esters, a polymerization inhibitor and at least one compound selected from the group consisting of condensed phosphoric acid salts and silicic acid salt.
2. An aqueous solution according to claim 1, wherein the unsaturated carboxylic acid ester is one member selected from the group consisting of an acrylic acid ester and methacrylic acid ester.
3. An aqueous solution according to claim 1, wherein the polymerization inhibitor is hydroquinone, hydroquinone monomethyl ether, pyrogalol, resorcinol, Methylene Blue or a mixture thereof.
4. An aqueous solution according to claim 1, the condensed phosphoric acid salt is sodium pyrophosphate, sodium tripolyphosphate, potassium tripolyphosphate, sodium tetrapolyphosphate, sodium tetrametaphosphate, sodium hexametaphosphate, potassium hexametaphosphate or a mixture thereof.
5. An aqueous solution according to claim 1, wherein the silicic acid salt is sodium silicate or potassium silicate.
6. An aqueous solution according to claim 1, wherein the amount of the polymerization inhibitor is 0.001 to 0.5% by weight based on the weight of the aqueous solution system.
7. An aqueous solution according to claim 1, wherein the amount of the compound is 0.001 to 1.0% by weight based on the weight of the aqueous solution system.
8. An aqueous solution according to claim 1, the acrylic acid ester is methyl acrylate and the methacrylic acid ester is methyl methacrylate.

References Cited
FOREIGN PATENTS

| | | | |
|---|---|---|---|
| 967 | 4/1962 | Japan | 260—486 |
| 20,286 | 8/1968 | Japan | 260—486 |

LORRAINE A. WEINBERGER, Primary Examiner

D. J. KILLOS, Assistant Examiner